(12) United States Patent
Kawano et al.

(10) Patent No.: US 10,902,530 B2
(45) Date of Patent: Jan. 26, 2021

(54) PRODUCTION PROCESS ANALYSIS METHOD

(71) Applicant: MITSUBISHI CHEMICAL ENGINEERING CORPORATION, Tokyo (JP)

(72) Inventors: Kouji Kawano, Tokyo (JP); Akio Ishikawa, Tokyo (JP)

(73) Assignee: Mitsubishi Chemical Engineering Corp., Tokyo (JP)

( * ) Notice: Subject to any disclaimer, the term of this patent is extended or adjusted under 35 U.S.C. 154(b) by 0 days.

(21) Appl. No.: 16/304,645

(22) PCT Filed: Mar. 6, 2017

(86) PCT No.: PCT/JP2017/008682
§ 371 (c)(1),
(2) Date: Nov. 26, 2018

(87) PCT Pub. No.: WO2018/078903
PCT Pub. Date: May 3, 2018

(65) Prior Publication Data
US 2019/0304037 A1    Oct. 3, 2019

(30) Foreign Application Priority Data

Oct. 26, 2016 (JP) .................. 2016-209179

(51) Int. Cl.
*G06Q 50/04* (2012.01)
*G05B 19/418* (2006.01)

(52) U.S. Cl.
CPC .......... *G06Q 50/04* (2013.01); *G05B 19/418* (2013.01); *G05B 19/4183* (2013.01);
(Continued)

(58) Field of Classification Search
CPC .. G06Q 50/04; G05B 19/418; G05B 19/4183; G05B 19/41875; G05B 2219/32179; Y02P 90/30; Y02P 90/02
See application file for complete search history.

(56) References Cited

U.S. PATENT DOCUMENTS 5,635,850 A * 6/1997 Ogura .................. H01L 22/20
324/750.05
7,405,088 B2 * 7/2008 Matsushita ............ H01L 22/20
257/E21.525
(Continued)

FOREIGN PATENT DOCUMENTS

JP    2005-284650    10/2005
JP    2016-177794    10/2016

OTHER PUBLICATIONS

International Search report dated May 23, 2017 in PCT/JP2017/008682; 2 pages, with English translation.

*Primary Examiner* — Charles R Kasenge
(74) *Attorney, Agent, or Firm* — Fattibene and Fattibene LLC; Paul A. Fattibene

(57) ABSTRACT

A production process analysis method for stabilizing the quality of the products or services. A production process analysis method includes: a step for identifying a good lot included in a group determined to be the most excellent with respect to each of a plurality of states constituting a production process; a step for classifying, in the case where at least one good lot is not shared among the plurality of states, the plurality of states into an arbitrarily selected selection state and other non-selection states, and determining again a highest-ranking group in the non-selection state that includes the good lot in the selection state as the most excellent group; and a step for identifying factors that characterize the group determined as the most excellent.

5 Claims, 19 Drawing Sheets

(52) U.S. Cl.
CPC ............. *G05B 19/41875* (2013.01); *G05B 2219/32179* (2013.01); *Y02P 90/02* (2015.11); *Y02P 90/30* (2015.11)

(56) References Cited

U.S. PATENT DOCUMENTS

| | | | |
|---|---|---|---|
| 2004/0255198 A1* | 12/2004 | Matsushita | H01L 22/20 |
| | | | 714/37 |
| 2005/0021303 A1* | 1/2005 | Matsushita | G11C 29/006 |
| | | | 702/185 |
| 2005/0251365 A1 | 11/2005 | Matsushita et al. | 702/185 |
| 2006/0259175 A1* | 11/2006 | Burda | G06Q 10/0631 |
| | | | 700/102 |
| 2015/0234379 A1* | 8/2015 | Vajaria | H01L 22/12 |
| | | | 700/121 |

\* cited by examiner

| LOT No. | PROCESS DATA ||||||||||||||| PRODUCT DATA |
| --- | --- | --- | --- | --- | --- | --- | --- | --- | --- | --- | --- | --- | --- | --- | --- | --- |
| | pPara1 | pPara2 | pPara3 | pPara4 | pPara5 | pPara6 | pPara7 | pPara8 | pPara9 | pPara10 | pPara11 | pPara12 | pPara13 | pPara14 | pPara15 | pPara16 | Number of times to replace |
| Z127X | 0.526 | 0.875 | 0.873 | 0.677 | -0.400 | 1.001 | 0.343 | 0.137 | -0.496 | -2.266 | -0.977 | 0.290 | 0.381 | 0.644 | 0.503 | 1.130 | -0.317 |
| Z128X | 1.122 | -0.215 | 0.193 | 1.057 | -1.282 | -0.528 | 1.415 | 1.692 | -1.037 | -1.980 | -0.906 | 0.327 | 0.446 | 0.159 | 0.262 | 0.832 | 0.512 |
| Z130X | -0.378 | 1.004 | 0.376 | -0.602 | -1.408 | -0.018 | 0.701 | 0.915 | -0.586 | 0.407 | 0.705 | 0.545 | 0.250 | -0.327 | -0.012 | -0.401 | 0.927 |
| Z131X | -0.012 | -0.792 | 0.327 | -0.474 | -0.804 | -1.194 | 0.046 | -0.840 | -1.097 | -1.013 | -1.817 | 0.818 | 0.512 | -0.596 | -0.184 | -0.203 | -0.317 |
| Z132 | 1.026 | -1.626 | 0.145 | -1.242 | -0.904 | -1.194 | -0.729 | -2.195 | 1.335 | -0.017 | 0.915 | 0.745 | 0.577 | -0.973 | -2.826 | -0.845 | -1.561 |
| Z133X | -1.416 | -0.664 | -3.812 | -0.346 | -1.030 | -1.390 | -2.396 | 0.915 | -1.247 | 1.310 | -0.766 | -0.511 | 0.315 | -0.327 | 0.640 | 0.735 | 0.098 |
| Z134X | -1.349 | -0.279 | 0.291 | -1.242 | 0.104 | -0.410 | -1.026 | 0.915 | -0.586 | -0.054 | -0.486 | 0.836 | 0.512 | -0.973 | 0.571 | 0.784 | 0.512 |
| Z135 | -1.397 | -1.434 | 0.303 | 1.317 | 0.859 | 0.805 | -0.610 | 0.137 | 0.284 | 0.444 | 1.265 | 0.654 | 0.577 | 0.538 | 0.331 | 0.685 | -0.732 |
| Z141X | -0.032 | 1.004 | -0.013 | 0.677 | -0.274 | -0.881 | -0.550 | -1.418 | -0.316 | 0.259 | -0.977 | -2.750 | -2.692 | 1.290 | 0.777 | 0.340 | 1.766 |
| Z142X | 0.805 | -0.278 | 0.181 | -0.602 | -0.778 | -0.136 | 1.058 | 0.137 | -0.797 | 0.075 | 0.354 | -0.986 | -2.365 | 1.129 | 0.331 | 0.488 | 0.098 |
| Z146 | -0.214 | -0.023 | 0.189 | 0.933 | 0.230 | -0.332 | 1.177 | 0.137 | 1.095 | 1.439 | 1.125 | 0.864 | 0.446 | 1.290 | -1.625 | 0.685 | -0.732 |
| Z147 | -0.128 | 2.608 | 0.230 | -0.090 | 0.985 | -0.528 | 0.462 | 0.137 | 0.495 | 1.199 | 0.284 | 0.509 | 0.446 | 0.644 | -0.733 | 0.784 | -1.146 |
| Z148 | -1.697 | 0.642 | 0.121 | 0.349 | -0.274 | 0.374 | 1.177 | -0.640 | 2.536 | -0.220 | -0.878 | -1.312 | 0.185 | -0.003 | -0.149 | -0.105 | -1.561 |
| Z150 | 1.343 | -0.279 | 0.189 | -0.346 | 0.859 | 2.569 | 0.105 | -1.418 | 0.434 | -0.091 | 1.615 | 0.491 | 0.446 | 1.129 | 0.743 | 0.093 | -0.732 |
| Z153X | 0.536 | -0.343 | 0.181 | -0.346 | 1.111 | 0.765 | 0.165 | 0.137 | 0.465 | 0.351 | 0.284 | -1.075 | 0.185 | -0.273 | 1.498 | -0.894 | 0.927 |
| Z155X | 0.651 | -0.087 | 0.145 | -1.753 | 1.237 | 0.609 | -0.252 | 0.137 | -0.586 | -0.017 | 0.915 | 0.199 | 0.512 | -1.027 | -0.297 | -1.783 | 1.342 |
| Z156X | 0.815 | 0.491 | 0.121 | 0.933 | 1.867 | 0.491 | -1.086 | 0.915 | 0.104 | 0.185 | -0.906 | 0.236 | -0.731 | -2.321 | 0.159 | -2.425 | 0.927 |

FIG. 3

| LOT No. | PROCESS DATA | | | | | | PRODUCT DATA |
|---|---|---|---|---|---|---|---|
| | w_Para1 | w_Para2 | w_Para3 | w_Para4 | w_Para5 | w_Para6 | Satisfactory coloring rate |
| Z127X | 0.526 | -2.230 | -0.400 | -1.722 | -0.136 | -1.198 | -0.318 |
| Z128X | 1.122 | 1.982 | -1.282 | 2.096 | 1.858 | 1.065 | 1.553 |
| Z130X | -0.378 | -0.826 | -1.408 | -0.449 | 1.086 | 1.819 | -0.318 |
| Z131X | -0.012 | -0.826 | -0.904 | -0.449 | -0.780 | -1.198 | 0.929 |
| Z132 | 1.026 | 0.578 | -0.904 | -0.449 | 0.250 | -0.444 | -1.565 |
| Z133X | -1.416 | 0.578 | -1.030 | -0.449 | -1.326 | 1.819 | 0.306 |
| Z134X | -1.349 | 0.578 | 0.104 | 0.823 | -1.648 | 1.065 | -0.734 |
| Z135 | -1.397 | 0.578 | 0.859 | 0.823 | -1.359 | -0.444 | -0.734 |
| Z141X | -0.032 | 0.578 | -0.274 | 0.823 | 1.858 | -0.444 | 1.553 |
| Z142X | 0.805 | -0.826 | -0.778 | -0.449 | -0.587 | -1.198 | 0.929 |
| Z146 | -0.214 | -0.826 | 0.230 | -0.449 | -0.265 | 0.311 | -0.942 |
| Z147 | -0.128 | 0.578 | 0.985 | -0.449 | 0.218 | -0.444 | -0.942 |
| Z148 | -1.897 | -0.826 | -0.274 | -1.722 | 0.121 | -1.198 | -0.110 |
| Z150 | 1.343 | -0.826 | 0.859 | -0.449 | -0.040 | -0.444 | -1.565 |
| Z153X | 0.536 | 0.578 | 1.111 | 0.823 | -0.040 | 0.311 | 0.514 |
| Z155X | 0.651 | 0.578 | 1.237 | 0.823 | 0.636 | 0.311 | 0.514 |
| Z156X | 0.815 | 0.578 | 1.867 | 0.823 | 0.153 | 0.311 | 0.929 |

FIG. 4

|  | PROCESS DATA | | | | | | | | PRODUCT DATA |
| --- | --- | --- | --- | --- | --- | --- | --- | --- | --- |
| LOT No. | LPara01 | LPara02 | LPara03 | LPara04 | LPara05 | LPara06 | LPara07 | LPara08 | Satisfactory coloring rate |
| Z127X | 0.526 | -2.230 | 0.875 | 0.873 | -2.410 | -0.400 | -1.642 | 1.001 | 1.032 |
| Z128X | 1.122 | 1.982 | -0.215 | 0.193 | 1.431 | -1.282 | 2.345 | -0.528 | 1.233 |
| Z130X | -0.378 | -0.826 | 1.004 | 0.376 | -1.129 | -1.408 | -0.313 | -0.018 | 1.032 |
| Z131X | -0.012 | -0.826 | -0.792 | 0.327 | 1.431 | -0.904 | -0.313 | -1.194 | 0.830 |
| Z132 | 1.026 | 0.578 | -1.626 | 0.145 | 0.151 | -0.904 | -0.313 | -1.194 | -1.589 |
| Z133X | -1.416 | 0.578 | -0.664 | -3.812 | 1.431 | -1.030 | -0.313 | -1.390 | 0.225 |
| Z134X | -1.349 | 0.578 | -0.279 | 0.291 | 0.151 | 0.104 | -0.313 | -0.410 | -0.783 |
| Z135 | -1.397 | 0.578 | -1.434 | 0.303 | 0.151 | 0.859 | 1.016 | 0.805 | -1.186 |
| Z141X | -0.032 | 0.578 | 1.004 | -0.013 | 0.151 | -0.274 | 1.016 | -0.881 | 1.233 |
| Z142X | 0.805 | -0.826 | -0.279 | 0.181 | -1.129 | -0.778 | -0.313 | -0.136 | 0.830 |
| Z146 | -0.214 | -0.826 | -0.023 | 0.169 | 0.151 | 0.230 | -0.313 | -0.332 | -0.984 |
| Z147 | -0.128 | 0.578 | 2.608 | 0.230 | 0.151 | 0.985 | -0.313 | -0.528 | -0.984 |
| Z148 | -1.897 | -0.826 | 0.042 | 0.121 | -1.129 | -0.274 | -1.642 | 0.374 | -0.178 |
| Z150 | 1.343 | -0.826 | -0.279 | 0.169 | 0.151 | 0.859 | -0.313 | 2.569 | -1.589 |
| Z153X | 0.536 | 0.578 | -0.343 | 0.181 | 0.151 | 1.111 | -0.313 | 0.765 | 0.427 |
| Z155X | 0.651 | 0.578 | -0.087 | 0.145 | 0.151 | 1.237 | 1.016 | 0.609 | 0.427 |
| Z156X | 0.815 | 0.578 | 0.491 | 0.121 | 0.151 | 1.867 | 1.016 | 0.491 | 0.024 |

FIG. 5

Principal Component Load Amount

| | PC1 | PC2 | PC3 |
|---|---|---|---|
| pPara1 | -0.34 | -0.27 | 0.35 |
| Ppara2 | 0.13 | -0.40 | -0.07 |
| Ppara3 | -0.51 | -0.58 | 0.32 |
| pPara4 | 0.25 | -0.53 | 0.09 |
| pPara5 | -0.54 | 0.05 | -0.08 |
| pPara6 | -0.54 | -0.40 | 0.12 |
| pPara7 | -0.22 | -0.78 | 0.15 |
| pPara8 | 0.41 | 0.07 | 0.50 |
| pPara9 | -0.61 | -0.14 | -0.45 |
| pPara10 | -0.15 | 0.40 | -0.72 |
| pPara11 | -0.72 | -0.02 | -0.31 |
| pPara12 | -0.44 | 0.27 | 0.57 |
| pPara13 | -0.38 | 0.33 | 0.44 |
| pPara14 | 0.12 | -0.72 | -0.45 |
| pPara15 | 0.47 | -0.23 | 0.09 |
| pPara16 | 0.47 | -0.42 | -0.12 |

FIG. 6A

Principal component score

| | PC1 | PC2 | PC3 |
|---|---|---|---|
| Z127X | 0.71 | -2.24 | 1.97 |
| Z128X | 1.85 | -1.91 | 2.86 |
| Z130X | 0.08 | 0.07 | 0.63 |
| Z131X | 1.04 | 0.89 | 1.72 |
| Z132 | -2.57 | 2.23 | -0.54 |
| Z133X | 3.66 | 3.60 | -1.30 |
| Z134X | 0.81 | 1.64 | 0.92 |
| Z135 | -0.79 | 0.02 | -0.46 |
| Z141X | 2.47 | -1.69 | -2.72 |
| Z142X | 1.08 | -1.63 | -0.94 |
| Z146 | -1.45 | -0.79 | -1.18 |
| Z147 | -0.60 | -0.68 | -0.90 |
| Z148 | -0.31 | -0.98 | -1.45 |
| Z150 | -2.55 | -1.34 | -0.38 |
| Z153X | -0.74 | -0.15 | -0.26 |
| Z155X | -1.92 | 1.54 | 0.76 |
| Z156X | -0.76 | 1.43 | 1.28 |

FIG. 6B

Principal Component Load Amount

| | PC1 | PC2 | PC3 |
|---|---|---|---|
| wPara1 | −0.28 | 0.85 | −0.06 |
| wPrara2 | −0.90 | −0.21 | −0.07 |
| wPara3 | −0.19 | 0.06 | −0.92 |
| wPara4 | −0.93 | −0.06 | −0.15 |
| wPara5 | −0.45 | 0.65 | 0.41 |
| wPara6 | −0.60 | −0.50 | 0.36 |

FIG. 7A

Principal component score

| | PC1 | PC2 | PC3 |
|---|---|---|---|
| Z127X | 2.81 | 1.26 | 0.25 |
| Z128X | −3.45 | 0.83 | 1.65 |
| Z130X | −0.03 | −0.34 | 2.35 |
| Z131X | 1.57 | 0.19 | 0.20 |
| Z132 | −0.05 | 0.92 | 0.68 |
| Z133X | 0.00 | −2.51 | 1.09 |
| Z134X | −0.53 | −2.43 | −0.43 |
| Z135 | −0.11 | −1.63 | −1.46 |
| Z141X | −1.17 | 1.01 | 0.63 |
| Z142X | 1.34 | 0.88 | 0.12 |
| Z146 | 0.72 | −0.24 | −0.06 |
| Z147 | −0.05 | 0.18 | −0.87 |
| Z148 | 2.35 | −0.55 | 0.29 |
| Z150 | 0.58 | 1.32 | −0.85 |
| Z153X | −1.18 | 0.14 | −1.04 |
| Z155X | −1.42 | 0.59 | −0.90 |
| Z156X | −1.39 | 0.48 | −1.63 |

FIG. 7B

Principal Component Load Amount

| | PC1 | PC2 | PC3 |
|---|---|---|---|
| LPara01 | -0.07 | -0.63 | 0.61 |
| LPara02 | 0.84 | -0.36 | -0.12 |
| LPara03 | -0.37 | -0.12 | -0.14 |
| LPara04 | -0.55 | -0.50 | 0.36 |
| LPara05 | 0.89 | -0.11 | -0.07 |
| LPara06 | -0.16 | -0.70 | -0.63 |
| LPara07 | 0.687 | -0.592 | 0.139 |
| LPara08 | -0.599 | -0.548 | -0.261 |

FIG. 8A

Principal component score

| | PC1 | PC2 | PC3 |
|---|---|---|---|
| Z127X | -3.90 | 0.64 | 0.70 |
| Z128X | 2.97 | -1.33 | 1.70 |
| Z130X | -1.33 | 1.09 | 0.78 |
| Z131X | 0.80 | 1.12 | 1.04 |
| Z132 | 1.02 | 0.52 | 1.65 |
| Z133X | 2.98 | 3.00 | -1.33 |
| Z134X | 0.40 | 0.62 | -0.75 |
| Z135 | 0.70 | -0.69 | -1.21 |
| Z141X | 0.91 | -0.18 | 0.29 |
| Z142X | -1.06 | 0.47 | 1.24 |
| Z146 | -0.41 | 0.39 | -0.08 |
| Z147 | -0.31 | -0.56 | -0.96 |
| Z148 | -1.76 | 1.80 | -1.08 |
| Z150 | -1.52 | -1.75 | -0.24 |
| Z153X | -0.15 | -1.16 | -0.57 |
| Z155X | 0.39 | -1.79 | -0.41 |
| Z156X | 0.25 | -2.18 | -0.76 |

FIG. 8B

PRODUCTION PROCESS ANALYSIS METHOD

TECHNICAL FIELD

The present invention relates to production process analysis methods, and in particular, to a production process analysis method that identifies a factor that causes variations in the quality of products or services.

BACKGROUND ART

In a production process of manufacturing products corresponding to a batch process such as fine chemical, and the like, production of various kinds in small amounts is responded through a step by an automated manufacturing equipment, a step of manual operation by an operator, and the like.

Furthermore, in a production process of providing services such as part washing, analysis of clinical trial results in drug medicine development, and the like, the manual operation by the operator is required even while using a washing device and an analyzing device.

In such production process that manufactures products and provides services, variation occurs in the quality of the products and services even among lots depending on the operation status of the equipment, the operation status of the operator, the manner of handling the raw materials and products, and the like.

In order to suppress the variation in the quality of the products, it is known to apply a principal component analysis and a cluster analysis on product data and process data related to a manufacturing process of the product to classify the lots of the manufacturing process to a plurality of groups, and identify a hindering factor, which is data contributing to the relative merit among the groups (see e.g., patent document 1).

In such manufacturing analysis method, the manufacturing process is efficiently improved by identifying the hindering factor contributing to the relative merit among the groups, and hence the quality of the product among the lots can be improved.

PRIOR ART REFERENCES

Patent Documents

Patent Document 1: Japanese Patent Publication No. 5956094

DISCLOSURE OF THE INVENTION

Problems to be Solved by the Invention

The analysis method described in patent document 1 is effective in improving the totally automated manufacturing process in which the manufacturing line is configured only by the manufacturing equipment. In the case of the production process in which the manufacturing step by the manufacturing equipment and the other steps are associated in a complicated manner such as the operator performing a manual operation on a half-finished product manufactured by the manufacturing equipment, partial optimization of the production process may be achieved but the entire production process is not improved if only the manufacturing step by the manufacturing equipment is improved by applying the analysis method.

There is thus a technical problem to be solved to identify a factor that causes variation in the quality of the product manufactured or the service provided through a complicated production process including an automated step by a machine equipment, a manual operation step by an operator, and the like, and stabilize the quality of the product or the service, where the present invention aims to solve such problem.

Means for Solving the Problems

The present invention is proposed to achieve the above object, where the invention described in an embodiment provides a production process analysis method of classifying lots of a production process into a plurality of groups based on data related to the production process of a product or a service, and identifying a factor, which is data representing a feature of the group, the production process analysis method comprising the steps of collecting the data for every lot of the production process; classifying the lots into a plurality of groups for every plurality of states constituting the production process, and determining a relative merit of each group for every state; identifying a good lot included in a group determined as most excellent for every state; determining whether or not at least one good lots is shared among the plurality of states; and classifying, when at least one good lot is not shared among the plurality of states, the plurality of states into an arbitrarily selected selection state and other non-selection states, and determining again a group including a good lot in the selection state excluding the most excellent group as a most excellent group in the non-selection state to identify the factor.

According to such configuration, when at least one good lot included in the group determined as most excellent in each state is not shared among the plurality of states, a group including the good lot in the selection state is determined again as a most excellent group in the non-selection state to identify the factor representing the feature of the group, so that an executable improvement of a complicated production process can be achieved.

The invention described in another embodiment provides a production process analysis method of classifying lots of a production process into a plurality of groups based on data related to the production process of a product or a service, and identifying a factor, which is data representing a feature among the group, the production process analysis method comprising the steps of collecting the data including quality data indicating a quality of the product or the service for every lot of the production process; classifying the lots into a plurality of groups for every plurality of states constituting the production process, and determining a relative merit of each group for every state; identifying a good lot included in a group determined as most excellent for every state; determining whether or not at least one good lots is shared among the plurality of states; and selecting, when at least one good lot is not shared among the plurality of states, a state including a group in which the product data is most excellent among the plurality of states as a selection state, and determining again a group including a good lot in the selection state other than the most excellent group as a most excellent group in other non-selection states excluding the selection state to identify the factor.

According to such configuration, when at least one good lot included in the group determined as most excellent in each state is not shared among a plurality of states, a state including a group in which the quality data is most excellent among the plurality of states is selected as the selection state, a group including the good lot in the selection state in other non-selection states excluding the selection state is determined again as a most excellent group to identify a factor representing the feature of the group, so that an executable improvement of a complicated production process can be achieved.

The invention described in another embodiment provides the production process analysis method, where in addition to the configuration of the production process analysis method described in other embodiments, a group including the good lot in the selection state in the non-selection state is a highest ranking group among the groups including the good lot in the selection state in the non-selection state.

According to such configuration, as the factor is identified based on the highest ranking group in which the product data is relatively superior than other groups in the non-selection state, an executable and effective improvement of the complicated production process can be achieved.

Effect of the Invention

The present invention can obtain a production process capable of providing satisfactory and stable products and services as an executable improvement of a complicated production process is carried out by classifying, when at least one good lot included in the group determined as most excellent in each state is not shared among a plurality of states, the plurality of states to an arbitrarily selected first state and other states, and determining again a group including a good lot in the first state as a most excellent group in other states to identify a factor representing a feature of the group.

Furthermore, the present invention can obtain a production process capable of providing satisfactory and stable products and services as an executable improvement of a complicated production process is carried out by selecting, when at least one good lot included in the group determined as most excellent in each state is not shared among a plurality of states, a state including a group in which quality data is most excellent among a plurality of states as a selection state, and determining again a group including the good lot in the selection state as a most excellent group in other non-selection states excluding the selection state to identify a factor representing a feature of the group.

BRIEF DESCRIPTION OF THE DRAWINGS

FIG. 3 shows a table indicating numerical values in which process data and product data for every lot in a manufacturing state are standardized.

FIG. 4 shows a table indicating numerical values in which the process data and the product data for every lot in an operation state are standardized.

FIG. 5 shows a table indicating numerical values in which the process data and the product data for every lot in a distribution state are standardized.

FIGS. 6A and 6B show a table showing a principal component load amount for every process data and a principal component score for every lot in the manufacturing state.

FIGS. 7A and 7B show a table showing the principal component load amount for every process data and the principal component score for every lot in the operation state.

FIGS. 8A and 8B show a table showing the principal component load amount for every process data and the principal component score for every lot in the distribution state.

BEST MODE FOR CARRYING OUT THE INVENTION

Figure 1:
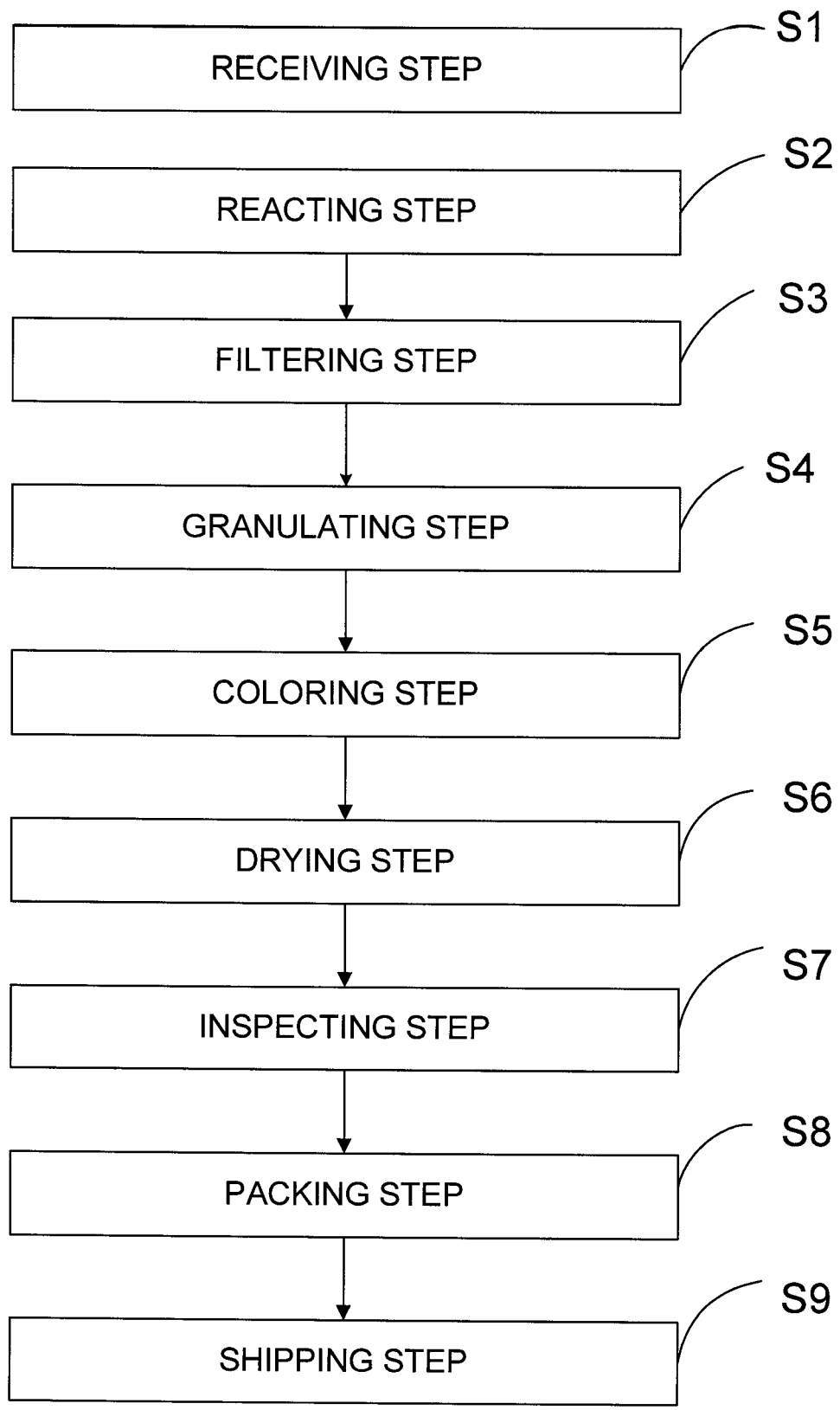
FIG. 1 is a flowchart showing steps of a manufacturing line to apply a production process analysis method according to a first example of the present invention.

To achieve the object of identifying a factor that causes variation in the quality of the product manufactured by or the service provided by a complicated production process including an automated step by a machine equipment and a manual operation by an operator to stabilize the quality of the product or the service, the present invention provides a production process analysis method of classifying lots of a production process into a plurality of groups based on data related to the production process of a product or a service, and identifying a factor, which is data representing a feature of the group, the production process analysis method including the steps of collecting the data for every lot of the production process; classifying the lots into a plurality of groups for every plurality of states constituting the production process, and determining a relative merit of each group for every state; identifying a good lot included in a group determined as most excellent for every state; determining whether or not at least one good lots is shared among the plurality of states; and classifying, when at least one good lot is not shared among the plurality of states, the plurality of states into an arbitrarily selected selection state and other non-selection states, and determining again a group including a good lot in the selection state excluding the group determined as most excellent as a most excellent group in the non-selection state to identify the factor.

To achieve the object of identifying a factor that causes variation in the quality of the product manufactured by or the service provided by a complicated production process including an automated step by a machine equipment and a manual operation by an operator to stabilize the quality of the product or the service, the present invention provides production process analysis method of classifying lots of a production process into a plurality of groups based on data related to the production process of a product or a service, and identifying a factor, which is data representing a feature of the group, the production process analysis method including the steps of collecting the data including quality data indicating a quality of the product or the service for every lot of the production process; classifying the lots into a plurality of groups for every plurality of states constituting the production process, and determining a relative merit of each group for every state; identifying a good lot included in a group determined as most excellent for every state; determining whether or not at least one good lot is shared among the plurality of states; and selecting, when at least one good lot is not shared among the plurality of states, a state including a group in which product data is most excellent among the plurality of states as a selection state, and determining again a group including a good lot in the selection state excluding the group determined as most excellent as a most excellent group in other non-selection states excluding the selection state to identify the factor.

EXAMPLES

An analysis method according to the present invention is applied to a process for manufacturing a product (article) or a process for providing a service (hereinafter collectively referred to as "production process"). The production process includes a process configured only by a machine equipment and in which all the steps are automated, a process including an operation step by a manual operation of an operator, and a process including a manufacturing step automated by the machine equipment and an operation step by the manual operation of the operator.

A production process analysis method according to a first example of the present invention will be hereinafter described. When mentioning number of constituent elements, numerical value, amount, range, and the like in the following examples, they are not limited to a specific number other than when particularly clearly indicated and when clearly limited to a specific number in principle, and may be greater than or equal to or smaller than or equal to a specific number.

FIG. 1 is a flowchart showing a step of a manufacturing line of a fine chemical serving as one example of a production process to apply the present invention. The production process to apply the present invention is not to be interpreted as being limited to the manufacturing line of the fine chemical, and it should be recognized that a manufacturing line of a product other than the fine chemical and a process of providing services are also encompassed therein.

The manufacturing line of the fine chemical is roughly divided to a pre-step and a post-step. The pre-step is a so-called batch process in which the operator inputs a raw material to a reacting furnace to react to raw material and manufacture a granulated half-finished product. The post-step is mainly a manual operation by the operator.

In the pre-process, the half-finished product is manufactured through a receiving step S1 of inputting the raw material to the reacting furnace, a reacting step S2 of reacting the raw material in the reacting furnace, a filtering step S3 of removing impurities, and a granulating step S4 of shaping the raw material to a granulate form of a predetermined size. In the pre-process, clogging of the filtering filter reduces as the reaction satisfactorily advances, and hence the quality (number of times to replace the filter) of the product in the pre-step is reduced. Thus, the granulating amount per unit time in the pre-step is increased.

In the post-step, the product is shipped after a coloring step S5 in which a predetermined color is applied to the half-finished product, a drying step S6 of drying the colored half-finished product with a drier, an inspecting step S7 of checking coloring failure, a packaging step S8 of individually packaging the product, and a shipping step S9. The quality (satisfactory coloring rate) of the product in the post-step has a negative correlation with the quality (number of times to replace the filter) of the pre-step. In other words, if the number of times to replace the filter is small and the granulating amount per unit time is large, mistakes easily occur in the coloring step S5 carried out through manual operation by the operator, and the coloring failure tends to increase.

Each equipment configuring the manufacturing line includes a sensor (not shown) for measuring various values. The measuring target of the sensor is input amount of the raw material, temperature of the reacting furnace, reacting temperature, granulating amount per unit time, and the like. The sensor transmits the measurement value to a control device that divides the manufacturing equipment configuring the manufacturing line.

The control device carries out the processes, to be described later, based on process data indicating a production condition of a product measured by the sensor, and product data (quality data) indicating the quality (number of times to replace the filter, satisfactory coloring rate, etc.) of the product. The process data is a factor that may influence the quality of the product, and includes the production condition of the production process (operation condition of manufacturing equipment, etc.), the condition of the raw material (physicality, composition, etc. of raw material), the content (operation time, number of movements, etc.) of the operation carried out manually by the operator, the content (retaining time of half-finished product, partly finished product, etc.) of handling of the product, and the like.

In the present example, the production process is classified into three states, manufacturing state, operation state, and distribution state, according to the type of process data. Specifically, the "manufacturing state" refers to that which may influence the quality of the product from the standpoint of the equipment. The "operation state" refers to that which may influence the quality of the product from the standpoint of the operator. The "distribution state" refers to that which may influence the quality of the product from the standpoint of the handling of the half-finished product and the product. The production process is not limited to that which can be classified to the three states above, and at least two or more states of the three states described above merely need to be included.

A plurality of states constituting the production process are correlated with each other, and it is sometimes difficult to uniformly improve the product data of all the states. Thus, the production process can be classified into a plurality of states, a factor (process data) that may influence the quality of the product can be individually grasped in each state by the analysis method, to be described later, and an executable improvement of the entire process can be realized while reviewing the influence of a change of a certain factor on the other states.

Figure 2:
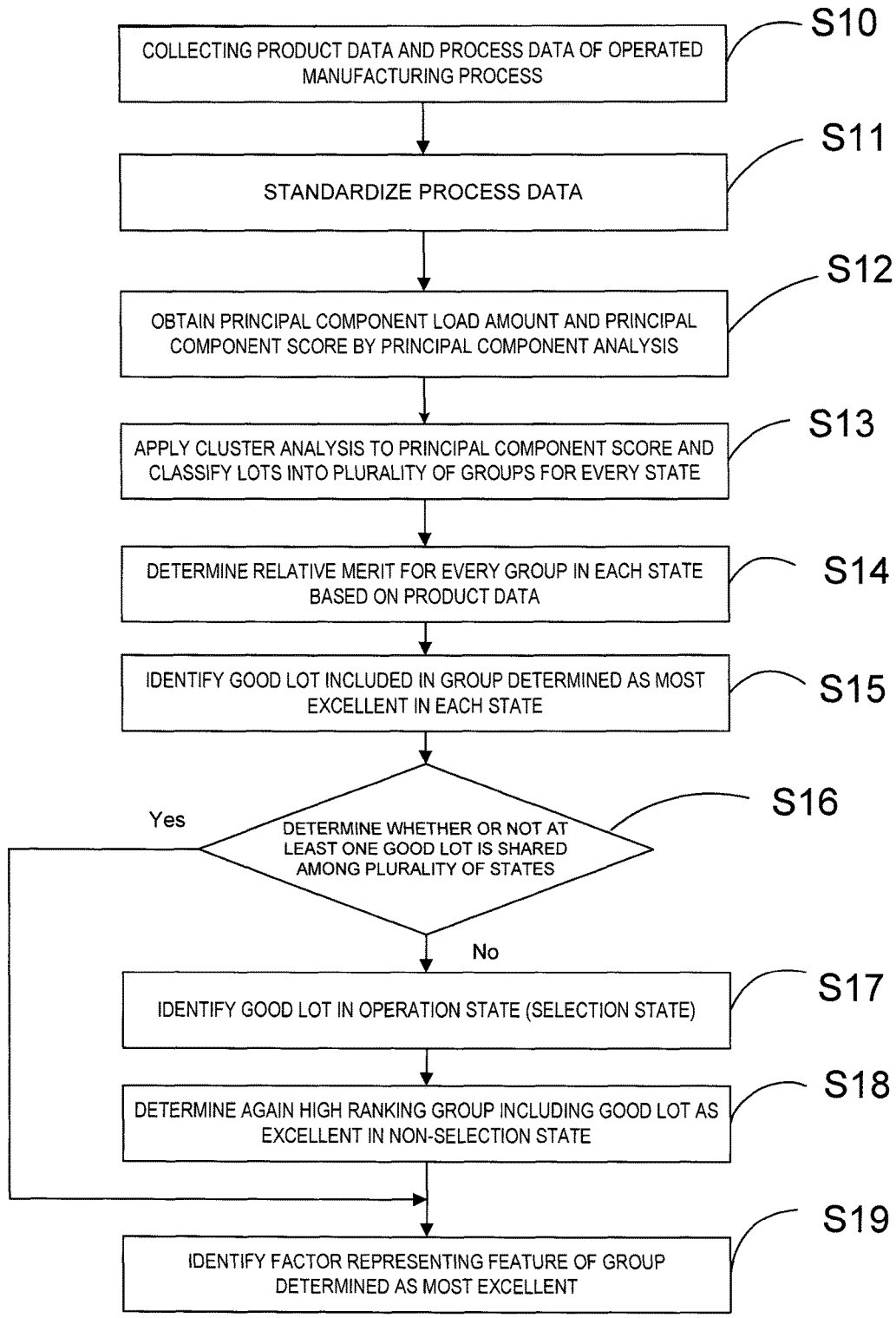
FIG. 2 is a flowchart showing the production process analysis method according to the first example of the present invention.

Next, a production process analysis method according to the present example will be described based on the drawings. FIG. 2 is a flowchart showing a production process analysis method according to the first example of the present invention.

First, the control device collects the process data and the product data measured by the sensor for the operated production process (S10). In step S10, the process data and the product data for every lot are stored in the control device.

Next, the process data and the product data collected in step S10 are standardized and converted to an intermediate function (S11).

FIG. 3 shows a table indicating numerical values in which the process data and the product data for every lot in the manufacturing state are standardized. In FIG. 3, process data pPara1 to 16 in the manufacturing state collected in each lot are shown for 17 lots. The process data pPara1 to 16 are receiving inspection value of the raw material, input amount, temperature in the reacting furnace, and the like. Furthermore, the product data is the number of times the filter in the reacting furnace is changed.

FIG. 4 shows a table indicating numerical values in which the process data and the product data for every lot in the operation state are standardized. In FIG. 4, process data wPara1 to 6 in the operation state collected in each lot are shown. The process data wPara1 to 6 are operation time, number of movements between operation sites, and the like. Furthermore, the product data is the satisfactory coloring rate of the product.

FIG. 5 shows a table indicating numerical values in which the process data and the product data for every lot in the distribution state are standardized. In FIG. 5, process data LPara1 to 8 in the distribution state collected in each lot are shown. The process data LPara1 to 8 are retaining time, lead time and the like of the half-finished product and the product. Furthermore, the product data is the satisfactory coloring rate of the product.

The standardizing process of the process data carried out in step S11 is known, and specifically, calculated by the control device based on equation 1.

[Equation 1]

$$Z = \frac{x - \mu}{\sigma} \quad [1]$$

$x$: Data, $\mu$: average value,
$\sigma$: standard deviation

A principal component analysis method is then applied on the intermediate variable obtained in step S11 to obtain a principal component load amount and a principal component score as shown in FIGS. 6 to 8 (S12). FIG. 6 is a view showing the principal component load amount for every process data and the principal component score for every lot in the manufacturing state. FIG. 7 is a view showing the principal component load amount for every process data and the principal component score for every lot in the operation state. FIG. 8 is a view showing the principal component load amount for every process data and the principal component score for every lot in the distribution state.

In step S12, first, a correlation coefficient matrix in the intermediate variable is created, and an eigenvalue and an eigenvector of the correlation coefficient matrix are derived. The correlation coefficient matrix is such that when the intermediate variable is x1, x2, x3, . . . , a first principal component PC1 is expressed as shown in equation 2. Furthermore, the $N^{th}$ principal component PCn is expressed as shown in equation 3. The correlation coefficient matrix is formed by using coefficients a11, a12, a13, . . . for elements of a first row and coefficients an1, an2, an3, . . . for elements of an $n^{th}$ row.

[Equation 2]

$$PC1 = a_{11} \times x_1 + a_{12} \times x_2 + a_{13} \times x_3 + \quad [2]$$

[Equation 3]

$$PCn = a_{n1} \times x_1 + a_{n2} \times x_2 + a_{n3} \times x_3 + \quad [3]$$

FIG. 6A shows information amount (principal component load amount) of the first principal component PC1, the second principal component PC2, and the third principal component PC3 of the process data pPara1 to 16 in the manufacturing state. FIG. 7A shows information amount (principal component load amount) of the first principal component PC1, the second principal component PC2, and the third principal component 3 of the process data wPara1 to 6 in the operation state. FIG. 8A shows information amount (principal component load amount) of the first principal component PC1, the second principal component PC2, and the third principal component PC3 of the process data LPara1 to 8 in the distribution state. In the present example, only three principal components are shown, but the number of principal components may be increased or decreased according to a contributing rate of each principal component.

Next, the principal component score is obtained from the eigenvector of the correlation coefficient matrix. Furthermore, the contributing rate of each principal component is obtained from the eigenvalue of the correlation coefficient matrix. The contributing rate of the principal component is obtained by dividing the eigenvalue by the sum of the eigenvalues. The first principal component, the second principal component, . . . $N^{th}$ principal component are determined from the larger eigenvalue.

Specifically, the control device calculates the value of the first principal component PC1, the second principal component PC2, . . . , that is, the principal component score based on the intermediate variable x1, x2, x3 of each lot and each coefficient of the correlation coefficient matrix. FIG. 6B shows the principal component score of each lot in the manufacturing state. FIG. 7B shows the principal component score of each lot in the operation state. FIG. 8B shows the principal component score of each lot in the distribution state.

Figure 9:
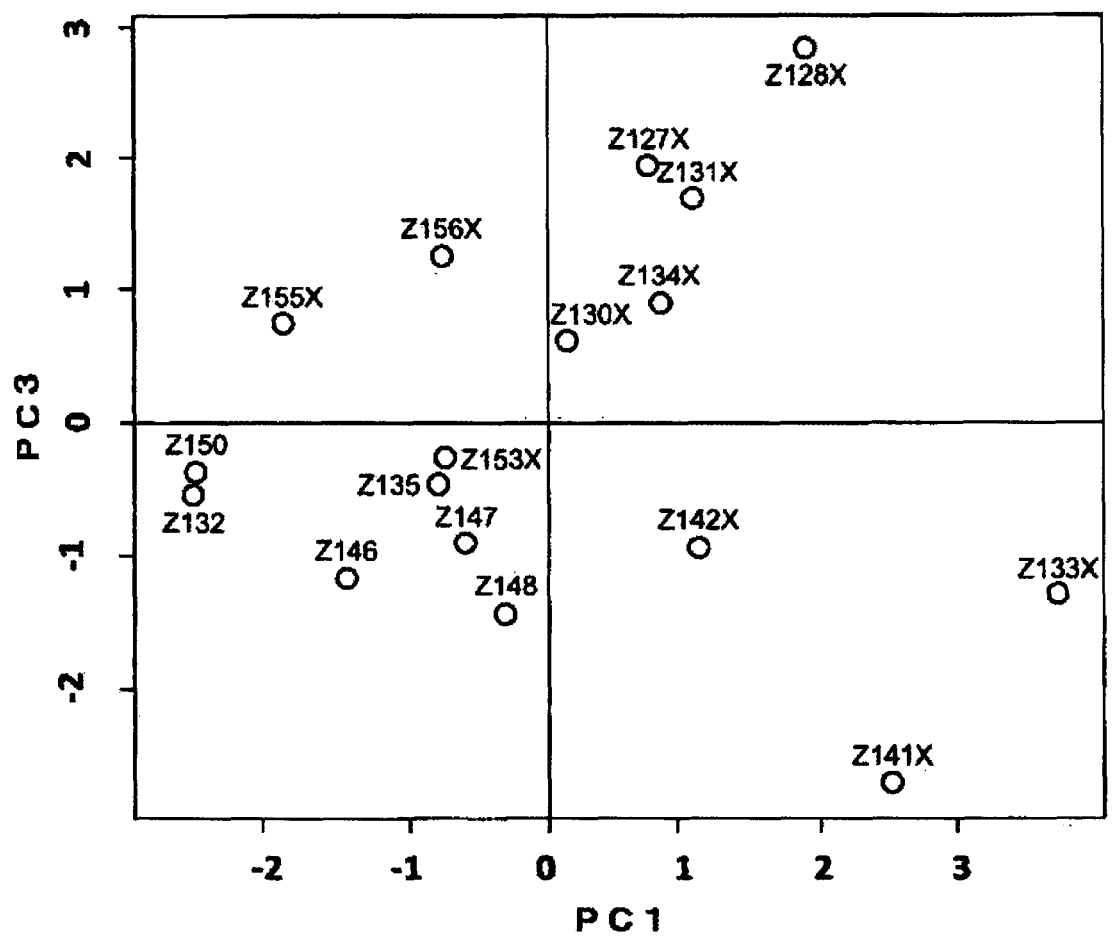
FIG. 9 is a graph in which the principal component scores shown in FIG. 6B are plotted on a coordinate system having a first principal component on a horizontal axis and a third principal component on a vertical axis.
Figure 10:
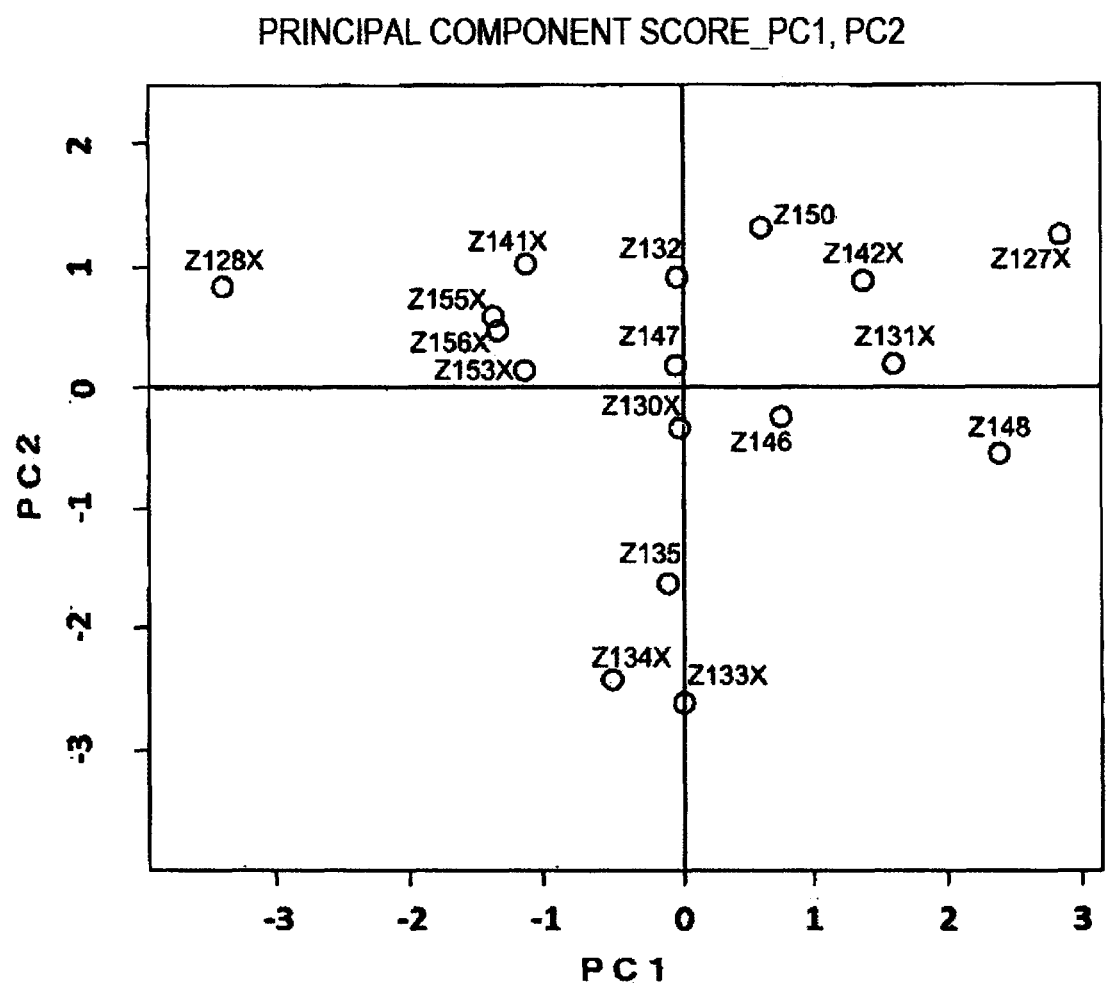
FIG. 10 is a graph in which the principal component scores shown in FIG. 7B are plotted on a coordinate system having the first principal component on a horizontal axis and a second principal component on a vertical axis.
Figure 11:
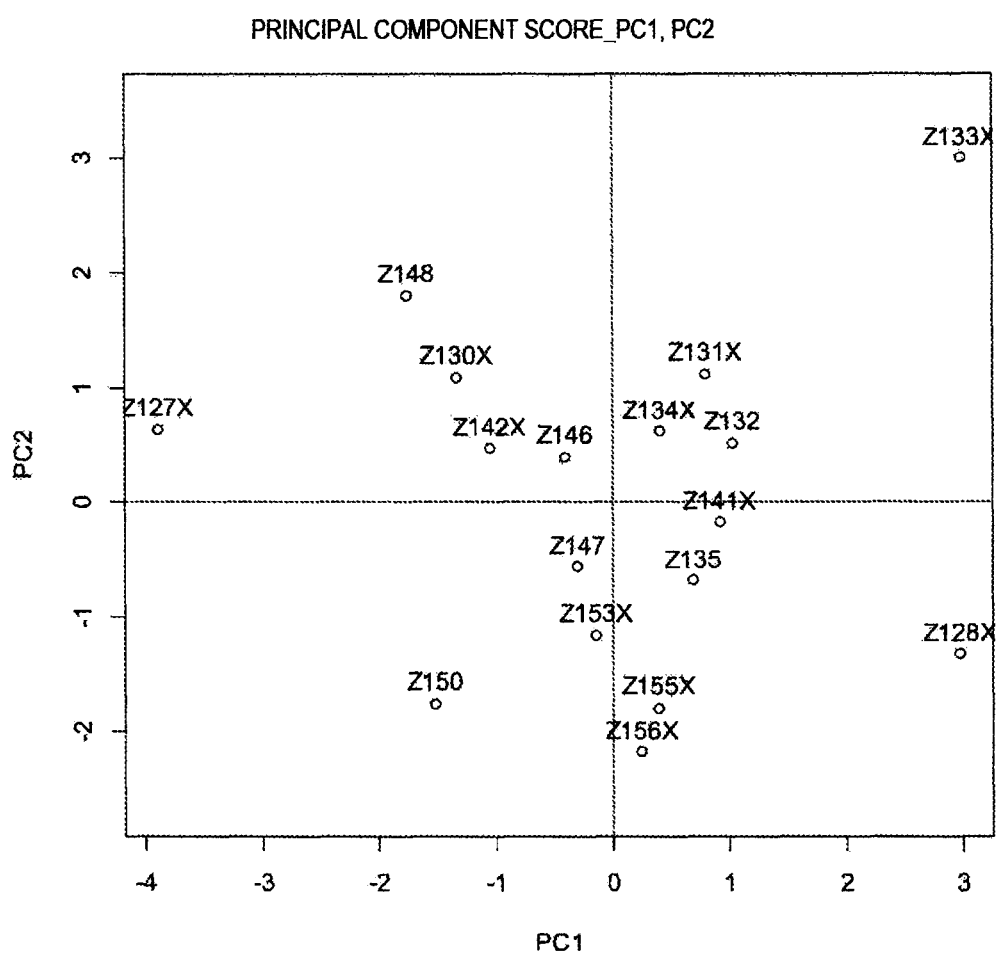
FIG. 11 is a graph in which the principal component scores shown in FIG. 8B are plotted on a coordinate system having the first principal component on a horizontal axis and the second principal component on a vertical axis.

FIG. 9 is a graph showing the principal component score in which the information amount shown in FIG. 6B are plotted to a coordinate system having the first principal component on a horizontal axis and the third principal component on a vertical axis of the manufacturing state. FIG. 10 is a graph showing the principal component score in which the information amount shown in FIG. 7B are plotted to a coordinate system having the first principal component on a horizontal axis and the third principal component on a vertical axis of the operation state. FIG. 11 is a graph showing the principal component score in which the information amount shown in FIG. 8B are plotted to a coordinate system having the first principal component on a horizontal axis and the third principal component on a vertical axis of the distribution state.

Next, the control device applies a cluster analysis on the principal component score shown in FIGS. 6B, 7B, and 8B to classify each lot into a plurality of groups (S13). The "cluster analysis" is a method of classifying data to be analyzed (cluster) into a plurality of groups focusing on similarity, and hierarchical clustering, classification optimization clustering, and the like are known. The "similarity" focused in the cluster analysis in the present example is the distance between the principal component scores of each lot. In the present example, an aggregation hierarchical clustering, which is one of the hierarchical clustering, is used. Furthermore, the Ward method that can stably obtain a solution is used as a method for calculating the distance between the clusters. The "Ward method" selects a cluster in which an increase amount of the sum of the squared deviations of when the two clusters are combined becomes a minimum. For example, when the clusters A, B are combined to generate the cluster C, the sum of the squared deviations Sa, Sb, Sc of the clusters A, B, C are expressed as equations 4 to 6, respectively.

[Equation 4]

$$Sa = \sum_{k=1}^{p}\sum_{i=1}^{n_a}(x_{ki}^A - \bar{x}_k^A)^2 \text{ where } \bar{x}_k^A = \frac{1}{n_a}\sum_{i=1}^{n_a}x_{ki}^A \quad [4]$$

$(1, 2, \ldots n_a)^{th}$ data in variable k $(1, 2, \ldots p)$ belonging to cluster A

[Equation 5]

$$Sb = \sum_{k=1}^{p}\sum_{i=1}^{n_b}(x_{ki}^B - \bar{x}_k^B)^2 \text{ where } \bar{x}_k^B = \frac{1}{n_b}\sum_{i=1}^{n_b}x_{ki}^B \quad [5]$$

$(1, 2, \ldots n_b)^{th}$ data in variable k $(1, 2, \ldots p)$ belonging to cluster B

[Equation 6]

$$Sc = \sum_{k=1}^{p}\sum_{i=1}^{n_y}(x_{ki}^C - \bar{x}_k^C)^2 = \sum_{k=1}^{p}\left[\sum_{i=1}^{n_a}(x_{ki}^A - \bar{x}_k^C)^2 + \sum_{i=1}^{n_b}(x_{ki}^B - \bar{x}_k^C)^2\right] \quad [6]$$

$$\text{where } \bar{x}_k^C = \frac{1}{n_c}\sum_{i=1}^{n_c}x_{ki}^C = \frac{n_a}{n_a+n_b}\bar{x}_k^A + \frac{n_b}{n_a+n_b}\bar{x}_k^B$$

The sum of the squared deviation Sc in the cluster C is calculated as below by equations 4 to 6.

[Equation 7]

$$Sb = Sa + Sb + \Delta Sab \text{ where } \Delta Sab = \frac{n_a n_b}{n_a+n_b}\sum_{k=1}^{p}(\bar{x}_k^A - \bar{x}_k^B)^2 \quad [7]$$

ΔSab of equation 7 is the increment of the sum of the squared deviation of when the clusters A, B are combined to generate the cluster C. Therefore, the clustering is proceeded by selecting and combining the clusters so that ΔSab becomes a minimum in each combining stage.

Figure 12:
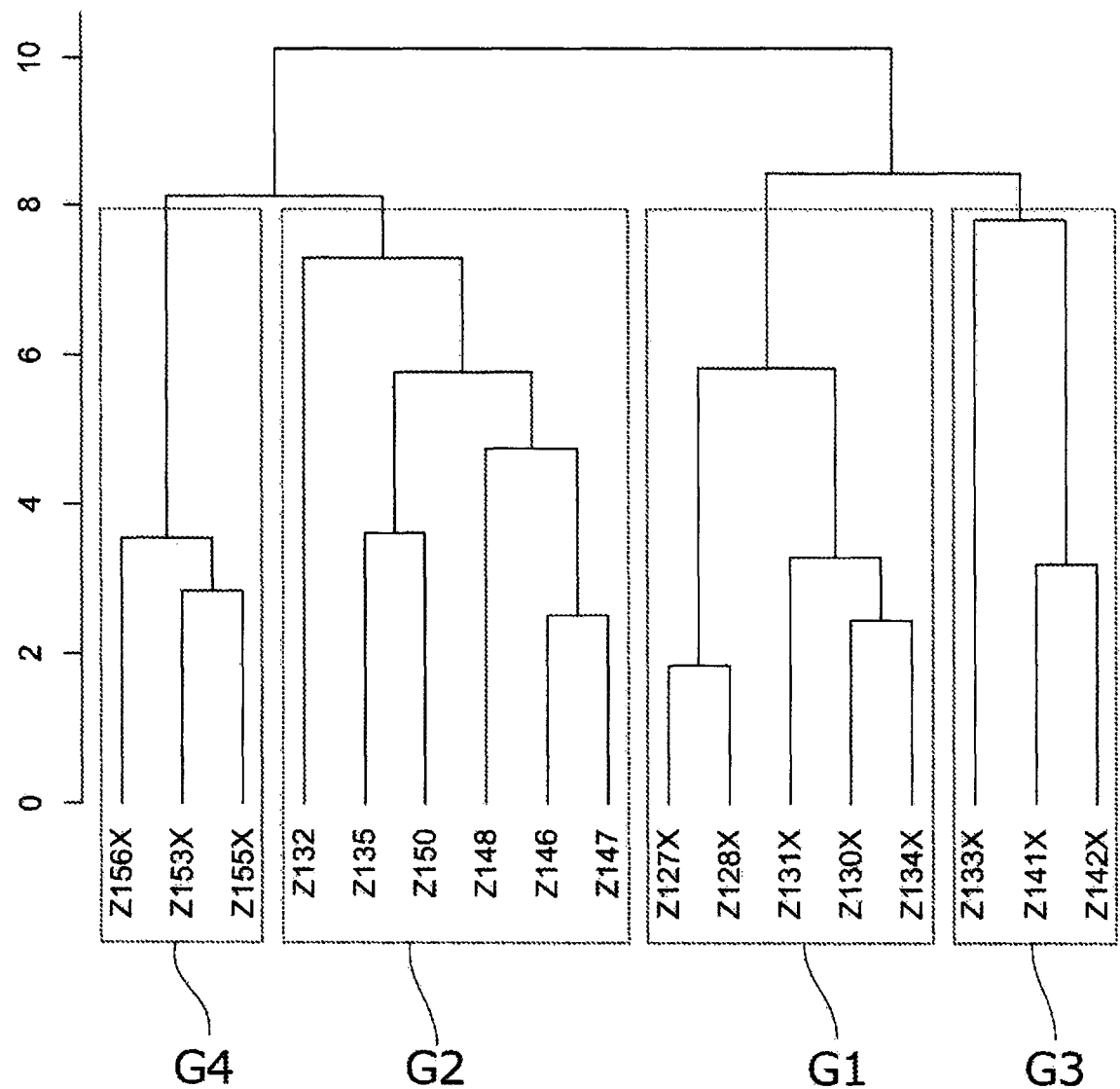
FIG. 12 is a view showing a dedrogram obtained by applying a cluster analysis on the principal component score shown in FIG. 9.

In the present example, as a result of the cluster analysis, each lot can be classified into four groups G1 to G4 in the manufacturing state, as shown in FIG. 12. This result is reflected on FIG. 9 and shown in FIG. 13. The number of groups is not limited to four, and may be three or less or five or more as long as it is a number that can be easily handled.

Figure 14:
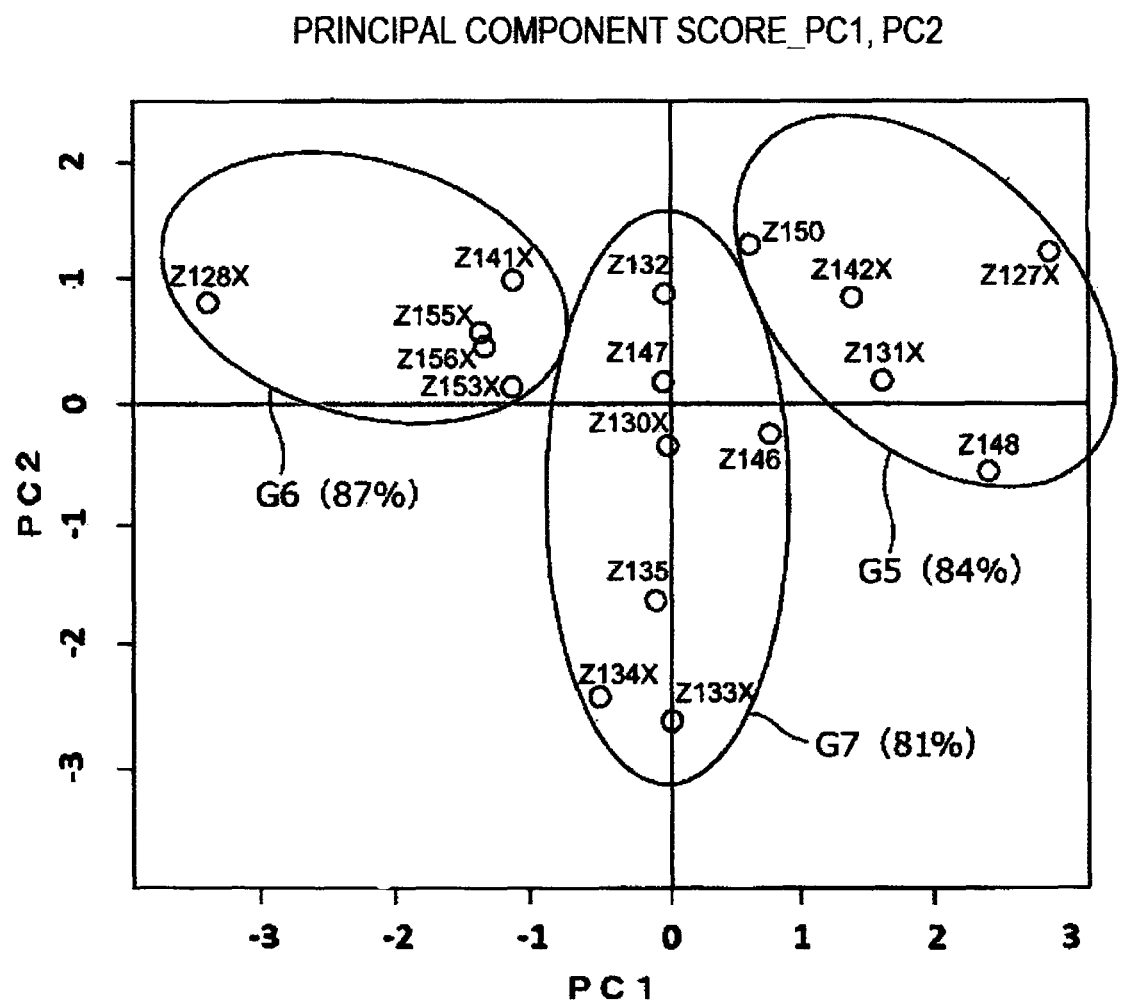
FIG. 14 is a graph reflecting the result of applying the cluster analysis on the principal component score in the operation state on FIG. 10.

Furthermore, the result of carrying out the cluster analysis in the operation state is reflected on FIG. 10 and shown in FIG. 14, and the classified group is referred to as groups G5 to G7. Furthermore, the result of carrying out the cluster analysis in the distribution state is reflected on FIG. 11 and shown in FIG. 15, and the classified group is referred to as groups G8 to G10.

The relative merit is then determined for every group (S14). In step S14, the manufacturing device calls out the intermediate variable obtained from the stored product data (number of times to replace the filter) related to the manufacturing state for every lot belonging to groups G1 to G4, and determines good/bad of the product data. Similarly for the operation state and the distribution state, the intermediate variable obtained from the product data (satisfactory coloring rate) is called out for every lot belonging to groups G5 to G10 for every lot belonging to groups G5 to G10, and good/bad of the product data is determined.

Figure 13:
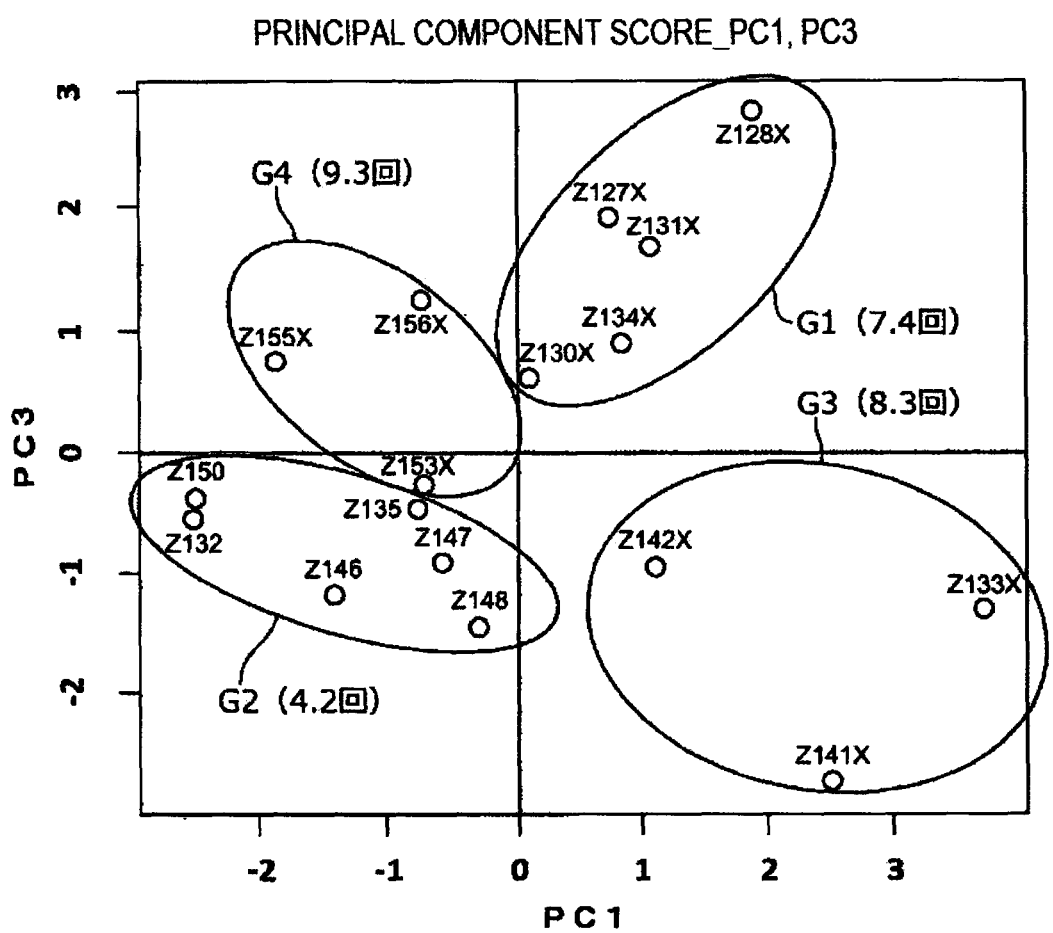
FIG. 13 is a graph showing the result of applying the analysis result of FIG. 12 on FIG. 9.
Figure 15:
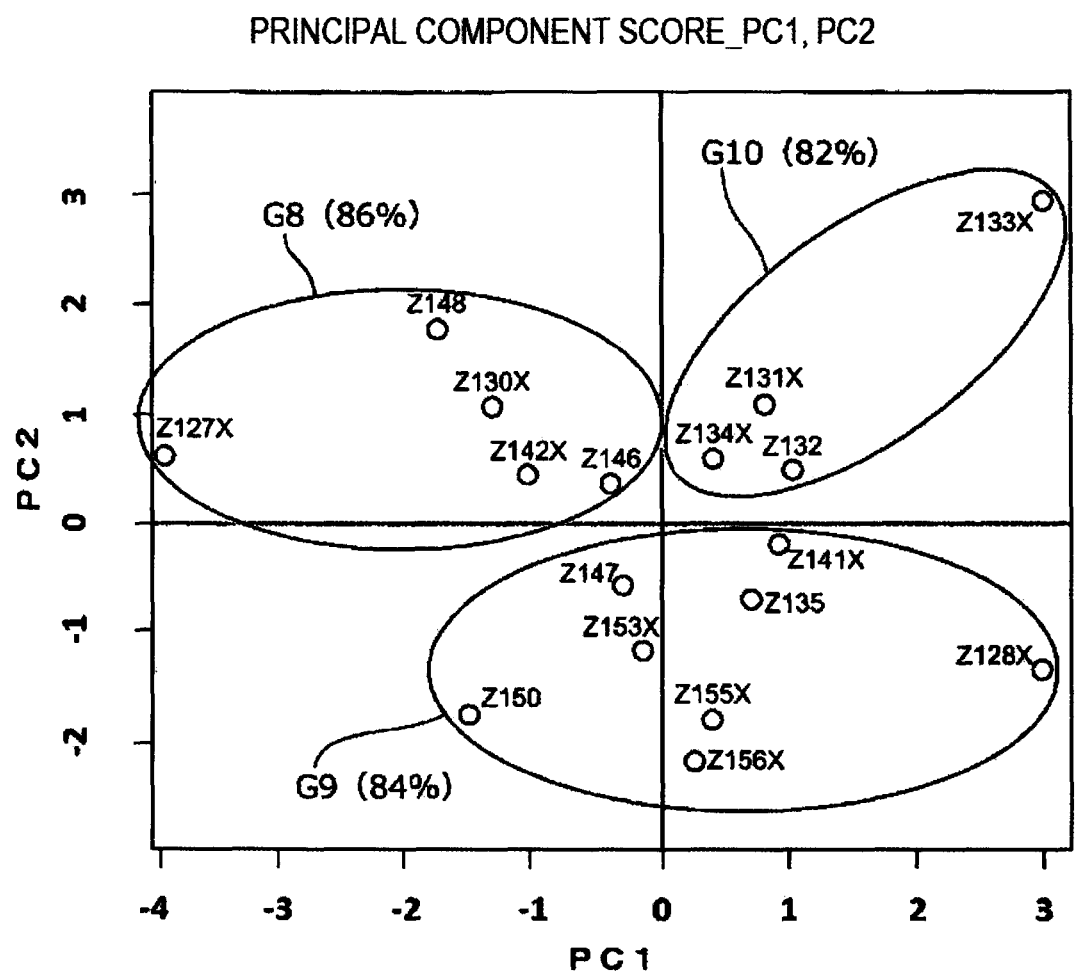
FIG. 15 is a graph reflecting the result of applying the cluster analysis on the principal component score in the distribution state on FIG. 11.

The good/bad of the product data is preferably carried out based on the average value of the group. Thus, the variation of the product data in the group is averaged, and the tendency of the good/bad of the product data among the groups can be comprehensively grasped. The numerical values in FIG. 13 are the product data (average value of the number of times to replace the filter) in each group. Furthermore, the numerical values in FIGS. 14 and 15 are the product data (average value of the satisfactory coloring rate) in each group.

The good/bad of the product data may be determined based on the magnitude of the deviation of the product data in the group, or the magnitude of the difference (range) of the maximum value and the minimum value, or may be determined by combining two or more of the average value, the deviation, the R value, or the like. Assuming the good/bad of the product data is determined by combining the average value and the deviation, for example, if the average value in the group is the same, the product data in which the deviation in the group is small can be assumed to be determined as good. Thus, the tendency of the good/bad of the product data among the groups taking into consideration the variation in the product data in the group can be comprehensively grasped.

The control device then compares the product data for every group in each state, and determines the relative merit. In other words, in the manufacturing state, the product data is compared for every group G1 to 4, and the relative merit among groups G1 to 4 is determined. Similarly, in the operation state, the product data is compared for every group G5 to 7, and the relative merit among groups G5 to 7 is determined; and in the distribution state, the product data is compared for every group G8 to 10, and the relative merit among groups G8 to 10 is determined.

Specifically, in the manufacturing state, group G2 indicates the most satisfactory product data, and as the product data is degrading in the order of G1, G3, G4, the relative merit among the groups is determined in the order of groups G2, G1, G3, G4. Furthermore, in the operation state, group G6 indicates the most satisfactory product data, and as the product data is degrading in the order of G5, G7, the relative merit among the groups is determined in the order of groups G6, G5, G7. Moreover, in the distribution state, group G8 indicates the most satisfactory product data, and as the product data is degrading in the order of G9, G10, the relative merit among the groups is determined in the order of groups G8, G9, G10.

Next, a lot (good lot) included in the group determined as excellent in each state is determined (S15). Specifically, the good lot included in group G2 in the manufacturing state, group G6 in the operation state, and group G8 in the distribution state is identified. The lot Nos. Z132, Z135, Z146, Z147, Z148 and Z150 are the good lots in the manufacturing state. Furthermore, the lot Nos. 128X, Z141X, Z153X, Z155X and Z156X are the good lots in the operation state. Moreover, the lot Nos. 127X, Z130X, Z142X, Z146X and Z148X are the good lots in the distribution state.

Next, whether or not at least one good lot is shared among the three states is then determined (S16). In the present example, the good lot shared among all groups G2, G6, G8 does not exist.

When at least one of each good lot in the manufacturing state, the operation state, and the distribution state is not shared (No in step S16), the good lot in the operation state is identified (S17). The good lot included in the operation state (selection state), is lot No. 128X, Z141X, X153X, X155X, and X156X.

In the manufacturing state and the distribution state (non-selection state), the group including the good lot in the operation state is re-determined as most excellent (S18). According to the present example, in the manufacturing state, group G1 is a group including the good lot Z128X in the operation state and of a higher ranking than the other groups G3, G4 including the good lot in the operation state in the manufacturing state. Furthermore, in the distribution state, group G9 including Z128X, Z153X, Z155X and Z156X is a group including the good lot in the operation state. Therefore, the most excellent group in the manufacturing state is assumed as G1 and the most excellent group in the distribution state is assumed as G9.

Figure 16:
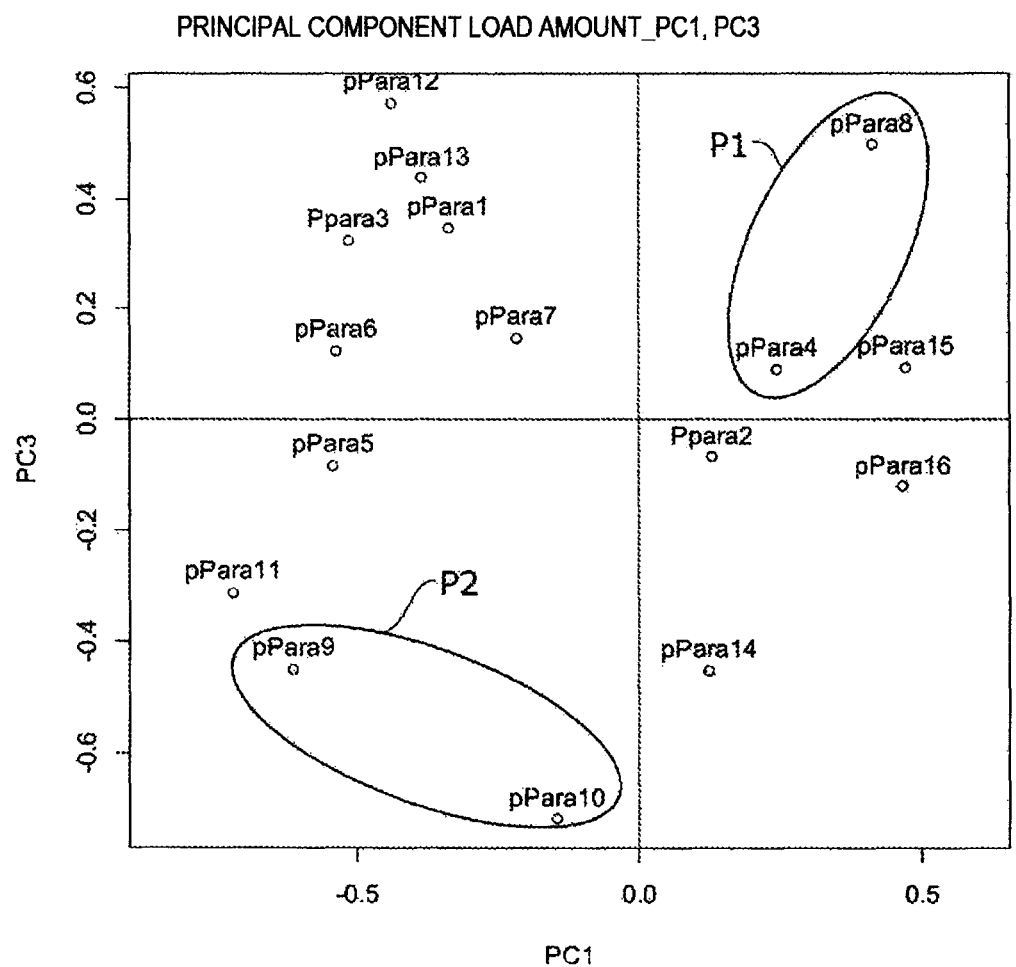
FIG. 16 is a graph in which the principal component load amounts shown in FIG. 6A are plotted on a coordinate system having a first principal component on a horizontal axis and a third principal component on a vertical axis.
Figure 17:
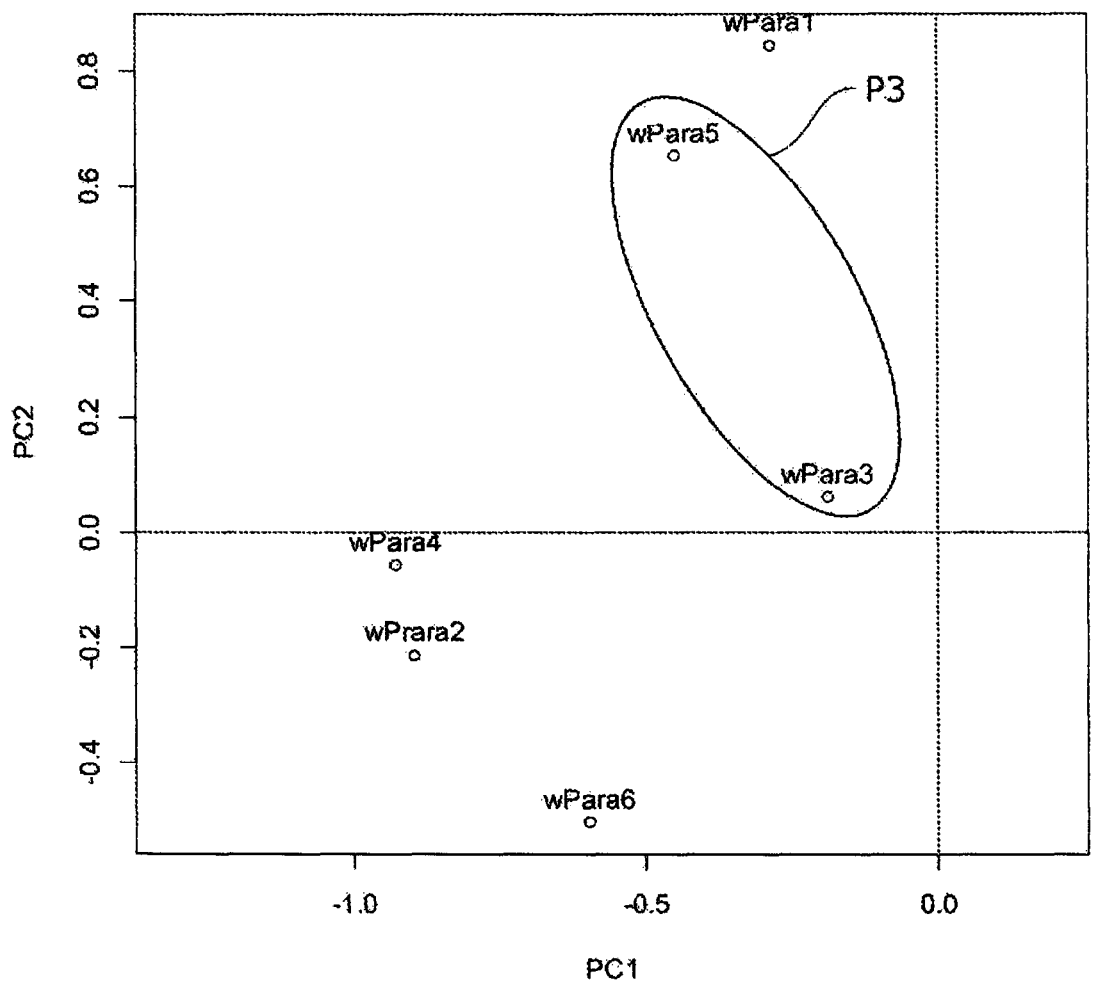
FIG. 17 is a graph in which the principal component load amounts shown in FIG. 7A are plotted on a coordinate system having the first principal component on a horizontal axis and a second principal component on a vertical axis.
Figure 18:
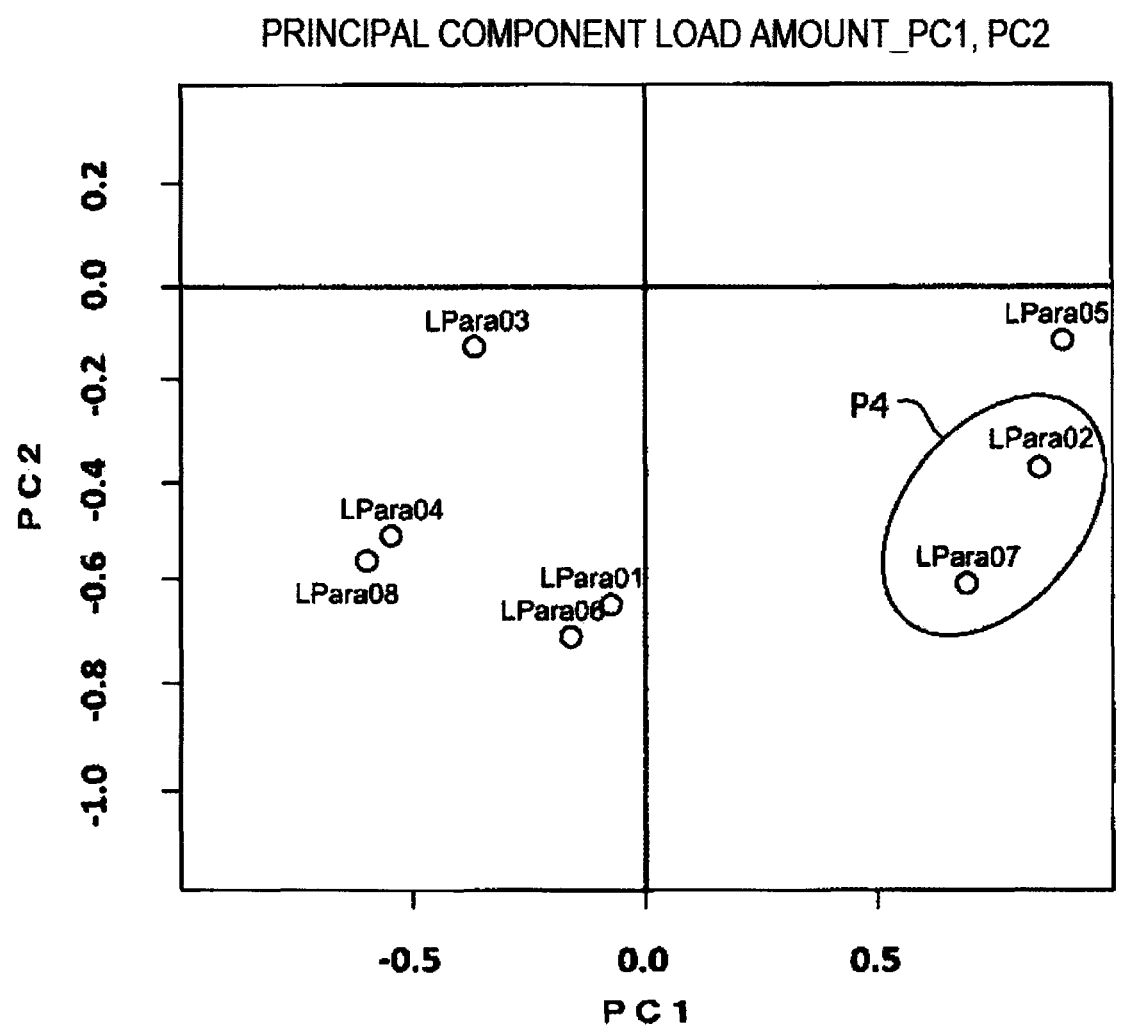
FIG. 18 is a graph in which the principal component load amounts shown in FIG. 8A are plotted on a coordinate system having the first principal component on a horizontal axis and the second principal component on a vertical axis.

Next, a factor representing the feature of the group determined as most excellent in each state is identified (S19). In step S19, a factor representing the feature of group G1 determined as most excellent is identified based on FIGS. 13 to 18. FIG. 16 is a graph showing a principal component load amount in which the information amount shown in FIG. 6A is plotted to a coordinate system having the first principal component on a horizontal axis and the third principal component on a vertical axis in the manufacturing state. Furthermore, FIG. 17 is a graph showing a principal component load amount in which the information amount shown in FIG. 7A is plotted to a coordinate system having the first principal component on a horizontal axis and the third principal component on a vertical axis in the operation state. FIG. 18 is a graph showing a principal component load amount in which the information amount shown in FIG. 8A is plotted to a coordinate system having the first principal component on a horizontal axis and the third principal component on a vertical axis in the distribution state.

When identifying the factor representing the feature of group G1 determined as most excellent in the manufacturing state, a characteristic arrangement relationship of group G1 on the coordinate system (hereinafter referred to as "PC1, 3 coordinate system") of the first principal component PC1 and the third principal component PC3 is given attention, and the process data pPara1 to 16 corresponding to the relevant position on the graph of the principal component load amount shown in FIG. 16 are identified as the factor or the process data characterizing group G1.

Specifically, as the most excellent group in the manufacturing state is changed to group G1 in step S18, the characteristic arrangement on the PC1, 3 coordinate system of group G1, that is, the first principal component PC1 coordinate being positive and the third principal component PC3 being positive on the PC1, 3 coordinate system is read. The process data corresponding to the characteristic arrangement on the PC1, 3 coordinate system of group G1 is then read from the graph of the principal component load amount shown in FIG. 16. The process data (pPara4, 8 etc.) existing in a first quadrant on the PC1, 3 coordinate system of the principal component load amount is thereby determined as a first factor P1 that may influence the product data in the manufacturing state.

Furthermore, on the graph of the principal component load amount shown in FIG. 16, the process data (pPara9, 10 etc.) near a position point symmetric to the first factor P1 with respect to the origin is determined as a second factor P2 that may influence the product data in the manufacturing state. This is because since each piece of process data on the PC1, 3 coordinate system of the principal component load amount is a vector, when a negative value is substituted to the second factor P2, data may be in the first quadrant in the PC1, 3 coordinate system of the principal component load amount.

Similarly in the operation state, based on FIGS. 14 and 17, a characteristic arrangement relationship of the most excellent group G6 on the coordinate system (hereinafter referred to as "PC1, 2 coordinate system") of the first principal component PC1 and the second principal component PC2 is given attention, and the process data (wPara3, 5 etc.) existing in a second quadrant on the PC1, 2 coordinate system shown in FIG. 17 is determined as a third factor P3.

In the distribution state, as the most excellent group in the distribution state is group G9, the process data (LPara2, 7 etc.) existing in a fourth quadrant on the PC1, 2 coordinate system shown in FIG. 18 corresponding to the characteristic arrangement of group G9 in the PC1, 2 coordinate system of FIG. 15 is determined as a fourth factor P4.

When at least one of each good lot in the manufacturing state, the operation state, and the distribution state is shared in step S16 (Yes in step S16), a factor that may influence the quality is identified similar to step S19 based on group G2 in the manufacturing state, group G5 in the operation state and group G8 in the distribution state determined in step S14.

As described above, in the invention according to the present example, when at least one good lot included in groups G2, G6, G8 determined as most excellent in each state is not shared among the three states, such states are classified into an arbitrarily selected selection state (operation state) and other selection states (manufacturing state, distribution state), the highest ranking groups G1, 9 including the good lot in the selection state are determined again as the most excellent groups in the non-selection state to identify the factors P1 to 4, so that the executable improvement of the complicated production process can be achieved, and the production process that stably indicates satisfactory product performance and manufacturing performance can be obtained.

Furthermore, the entire production process can be improved to enable the operator to efficiently carry out the operation by preferentially identifying the factor that may influence the quality in the operation state over the factor that may influence the quality in the manufacturing state or the distribution state.

Figure 19:
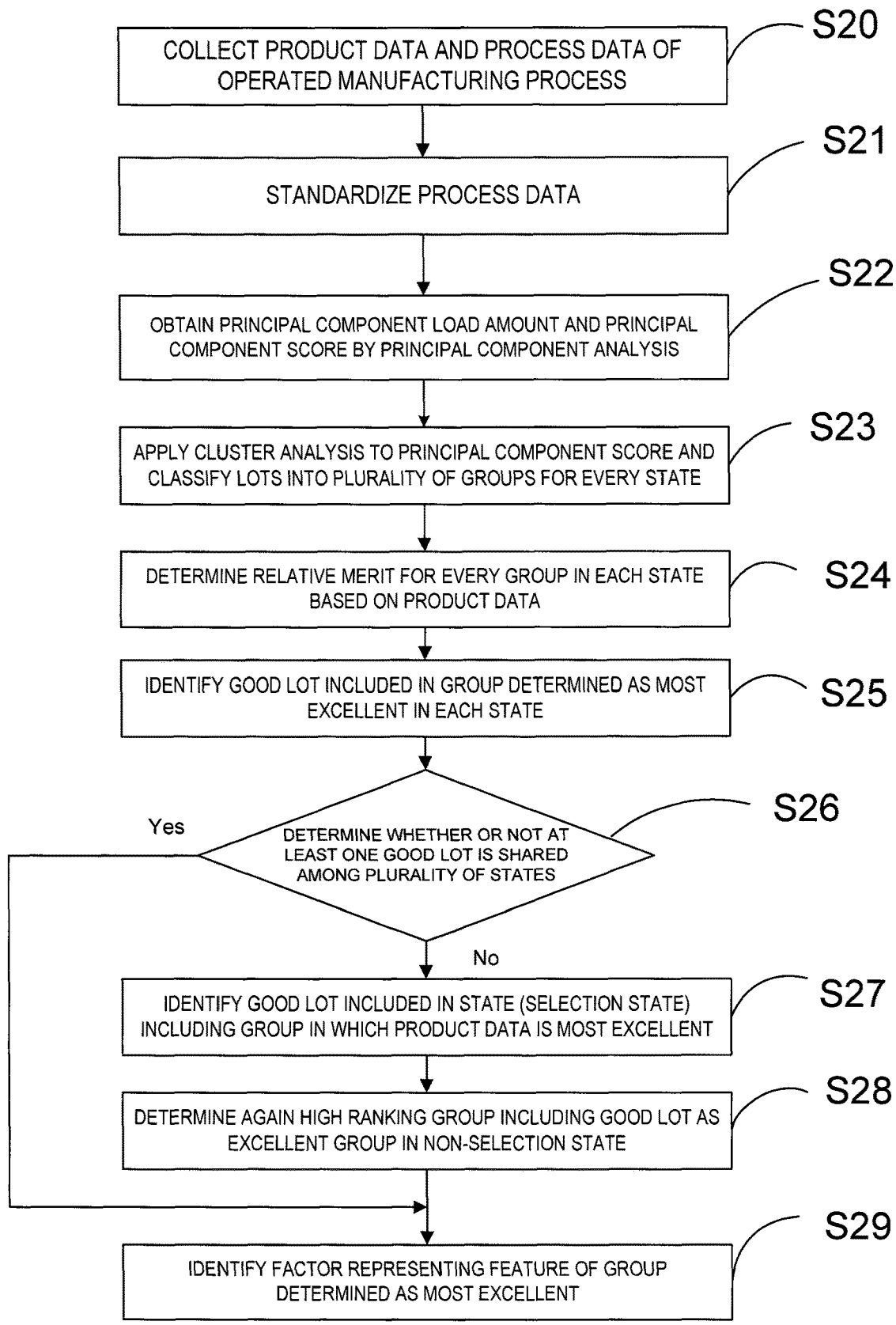
FIG. 19 is a flowchart showing a production analysis method according to a second example of the present invention.

Now, a production process analysis method according to a second example of the present invention will be described based on the drawings. FIG. 19 is a flowchart showing a production process analysis according to the second example of the present invention. The production process analysis method according to the present example differs only in the step corresponding to step S17 of the first example, and other steps are common. Therefore, steps redundant with the first example of the steps of the present example are denoted with reference numerals in the 20s, and the description redundant with the description of the first example will be omitted.

First, the lots of the production process are classified into a plurality of groups, the lot (good lot) included in the most excellent group is identified in each state, and whether or not at least one good lot is shared among the states is determines (S20 to 26), in the procedure similar to steps S10 to 16 according to the first example described above.

When at least one of each good lot in the manufacturing state, the operation state, and the distribution state is not shared (No in step S26), the good lot included in the group in which the product data is the most excellent is identified (S27). In the present example, the product data G6 in the operation state and the product data G8 in the distribution state are both common in the satisfactory coloring rate, and can be compared. As the product data of group G6 in the operation state is 87% and the product data of group G8 in the distribution state is 86%, the group in which the product data (satisfactory coloring rate) that can be compared is the most excellent becomes group G6. The good lot included in group G6 is lot Nos. 128X, Z141X, Z153X, Z155X and Z156X, as shown in FIG. 14.

In the manufacturing state and the distribution state, the highest ranking group including the good lot in the operation state is determined again as most excellent (S28), and the factors P1 to 4 representing the features of the group are identified (S29) through the procedure similar to steps S28 and 29.

As described above, in the invention according to the present example, when at least one good lot included in groups G2, G6, G8 determined as most excellent in each state is not shared among the three states, a state (operation state) including group G6 in which the product data is the most excellent among the states is selected as the selection state, the highest ranking groups G2, 9 including the good lot in the selection state is determined as the most excellent group in other non-selection states (manufacturing state, distribution state) excluding the selection state to identify the factors P1 to 4 representing the feature of each group, so that the production process including the fully automated operation of the manufacturing equipment and the manual operation of the operator is efficiently improved, and the production process that stably indicates satisfactory product performance and manufacturing performance can be obtained.

The present invention can be variously modified without deviating from the spirit of the invention, and it should be recognized that the invention encompasses all modifications.

The term "production process" in the present invention includes a process for manufacturing a product (article) or a process for providing a service. In other words, the production process is not limited to a process for manufacturing articles. The service provided in the production process includes, for example, services such as part washing, analysis of clinical trial results in drug medicine development, and the like. Furthermore, in the example described above, the production process including the manufacturing state, the operation state, and the distribution state has been described by way of example, but it is not necessarily limited to the production process including such three states, and merely needs to include at least two of the three states.

FIG. 1
S1 RECEIVING STEP
S2 REACTING STEP
S3 FILTERING STEP
S4 GRANULATING STEP
S5 COLORING STEP
S6 DRYING STEP
S7 INSPECTING STEP
S8 PACKAGING STEP
S9 SHIPPING STEP

FIG. 2
S10 COLLECT PRODUCT DATA AND PROCESS DATA OF OPERATED MANUFACTURING PROCESS
S11 STANDARDIZE PROCESS DATA
S12 OBTAIN PRINCIPAL COMPONENT LOAD AMOUNT AND PRINCIPAL COMPONENT SCORE BY PRINCIPAL COMPONENT ANALYSIS
S13 APPLY CLUSTER ANALYSIS TO PRINCIPAL COMPONENT SCORE AND CLASSIFY LOTS INTO PLURALITY OF GROUPS FOR EVERY STATE
S14 DETERMINE RELATIVE MERIT FOR EVERY GROUP IN EACH STATE BASED ON PRODUCT DATA
S15 IDENTIFY GOOD LOT INCLUDED IN GROUP DETERMINED AS MOST EXCELLENT IN EACH STATE
S16 DETERMINE WHETHER OR NOT AT LEAST ONE GOOD LOT IS SHARED AMONG PLURALITY OF STATES
S17 IDENTIFY GOOD LOT IN OPERATION STATE (SELECTION STATE)
S18 DETERMINE AGAIN HIGH RANKING GROUP INCLUDING GOOD LOT AS EXCELLENT IN NON-SELECTION STATE
S19 IDENTIFY FACTOR REPRESENTING FEATURE OF GROUP DETERMINED AS MOST EXCELLENT

FIG. 3
1 PROCESS DATA
2 PRODUCT DATA
3 NUMBER OF TIMES TO REPLACE

FIG. 4
1 PROCESS DATA
2 PRODUCT DATA
3 SATISFACTORY COLORING RATE

FIG. 5
1 PROCESS DATA
2 PRODUCT DATA
3 SATISFACTORY COLORING RATE

FIG. 6
1 PRINCIPAL COMPONENT LOAD AMOUNT
2 PRINCIPAL COMPONENT SCORE

FIG. 7
1 PRINCIPAL COMPONENT LOAD AMOUNT
2 PRINCIPAL COMPONENT SCORE

FIG. 8
1 PRINCIPAL COMPONENT LOAD AMOUNT
2 PRINCIPAL COMPONENT SCORE

FIG. 9
1 PRINCIPAL COMPONENT SCORE_PC1, PC3
FIG. 10
1 PRINCIPAL COMPONENT SCORE_PC1, PC2
FIG. 11
1 PRINCIPAL COMPONENT SCORE_PC1, PC2
FIG. 13
1 PRINCIPAL COMPONENT SCORE_PC1, PC3
FIG. 14
1 PRINCIPAL COMPONENT SCORE_PC1, PC2
FIG. 15
1 PRINCIPAL COMPONENT SCORE_PC1, PC2
FIG. 16
1 PRINCIPAL COMPONENT LOAD AMOUNT_PC1, PC3
FIG. 17
1 PRINCIPAL COMPONENT LOAD AMOUNT_PC1, PC2
FIG. 18
1 PRINCIPAL COMPONENT LOAD AMOUNT_PC1, PC2
FIG. 19
S20 COLLECT PRODUCT DATA AND PROCESS DATA OF OPERATED MANUFACTURING PROCESS
S21 STANDARDIZE PROCESS DATA
S22 OBTAIN PRINCIPAL COMPONENT LOAD AMOUNT AND PRINCIPAL COMPONENT SCORE BY PRINCIPAL COMPONENT ANALYSIS
S23 APPLY CLUSTER ANALYSIS TO PRINCIPAL COMPONENT SCORE AND CLASSIFY LOTS INTO PLURALITY OF GROUPS FOR EVERY STATE
S24 DETERMINE RELATIVE MERIT FOR EVERY GROUP IN EACH STATE BASED ON PRODUCT DATA
S25 IDENTIFY GOOD LOT INCLUDED IN GROUP DETERMINED AS MOST EXCELLENT IN EACH STATE
S26 DETERMINE WHETHER OR NOT AT LEAST ONE GOOD LOT IS SHARED AMONG PLURALITY OF STATES
S27 IDENTIFY GOOD LOT INCLUDED IN STATE (SELECTION STATE) INCLUDING GROUP IN WHICH PRODUCT DATA IS MOST EXCELLENT
S28 DETERMINE AGAIN HIGH RANKING GROUP INCLUDING GOOD LOT AS EXCELLENT GROUP IN NON-SELECTION STATE
S29 IDENTIFY FACTOR REPRESENTING FEATURE OF GROUP DETERMINED AS MOST EXCELLENT

What is claimed is:

1. A production process analysis method of classifying lots of a production process into a plurality of groups based on data related to the production process of a product or a service, and identifying a factor, which is data representing a feature of the group, the production process analysis method comprising the steps of:
    collecting the data for every lot of the production process;
    classifying the lots into a plurality of groups for every plurality of states constituting the production process, and determining a relative merit of each group for every state;
    identifying a good lot included in a group determined as most excellent for every state;
    determining whether or not at least one good lot is shared among the plurality of states;
    classifying, when at least one good lot is not shared among the plurality of states, the plurality of states into an arbitrarily selected selection state and other non-selection states, and determining again a group including a good lot in the selection state as a most excellent group in the non-selection state to identify the factor; and
    controlling the factor wherein an executable improvement to the production process is realized and variation in the quality of the production process is reduced and stability of the production process is obtained.

2. The production process analysis method according to claim 1, wherein a group including the good lot in the selection state in the non-selection state is a highest ranking group among the groups including the good lot in the selection state in the non-selection state.

3. A production process analysis method of applying a principal component analysis and a cluster analysis on data related to a production process of a product or a service to classify lots of the production process into a plurality of groups, and identifying a factor, which is data representing a feature among the groups, the production process analysis method comprising the steps of:
    collecting the data including quality data indicating a quality of the product or the service for every lot of the production process;
    classifying the lots into a plurality of groups for every plurality of states constituting the production process, and determining a relative merit of each group for every state;
    identifying a good lot included in a group determined as most excellent for every state;
    determining whether or not at least one good lot is shared among the plurality of states; and
    selecting, when at least one good lot is not shared among the plurality of states, a state including a group in which the quality data is most excellent among the plurality of states as a selection state, and determining again a group including a good lot in the selection state as a most excellent group in other non-selection states excluding the selection state to identify the factor; and
    controlling the factor wherein an executable improvement to the production process is realized and variation in the quality of the production process is reduced and stability of the production process is obtained.

4. The production process analysis method according to claim 3, wherein a group including the good lot in the selection state in the non-selection state is a highest ranking group among the groups including the good lot in the selection state in the non-selection state.

5. A method of stabilizing a production process produced in lots having a plurality of states comprising the steps of:
    collecting production process data for each of the lots;
    performing a principal component analysis to calculate a principal component load amount for every process data and a principal component score for each of the lots for each of the plurality of states;
    applying a cluster analysis on the principle component scores forming a plurality of groups of the lots for each of the plurality of states;
    determining a relative merit for each of the plurality of groups of the lots;
    identifying a most excellent group for each of the plurality of states based on a highest rank of the relative merit for each group that has a common lot among the plurality of groups of the lots;
    identifying a factor of the most excellent group for each of the plurality of states that most influences a quality of the production process; and controlling the factor for the plurality of states in the production process wherein the stability and quality of the production process is maintained or improved.

* * * * *